United States Patent [19]
Kurokawa et al.

[11] Patent Number: 5,958,826
[45] Date of Patent: Sep. 28, 1999

[54] BURNED GAS PURIFYING CATALYST

[75] Inventors: Takahiro Kurokawa; Akihide Takami; Makoto Kyogoku, all of Hiroshima; Hideharu Iwakuni, Higashihroshima; Kenji Okamoto; Hirosuke Sumida, both of Hiroshima; Kenichi Yamamoto, Higashihroshima; Hiroshi Murakami, Hiroshima, all of Japan

[73] Assignee: Mazda Motor Corporation, Hiroshima, Japan

[21] Appl. No.: 08/895,880

[22] Filed: Jul. 17, 1997

Related U.S. Application Data

[63] Continuation of application No. 08/639,507, Apr. 29, 1996, Pat. No. 5,667,258.

[30] Foreign Application Priority Data

Apr. 28, 1995 [JP] Japan ..................................... 7-104498
Mar. 29, 1996 [JP] Japan ..................................... 8-077821

[51] Int. Cl.$^6$ .............................. B01J 23/00; B01J 23/42; B01D 50/00
[52] U.S. Cl. ......................... 502/303; 502/304; 502/326; 502/333; 502/334; 502/339; 422/177
[58] Field of Search ............................... 502/73, 303, 304, 502/326, 333, 334, 339; 422/177

[56] References Cited

U.S. PATENT DOCUMENTS

| | | | |
|---|---|---|---|
| 5,057,483 | 10/1991 | Wan ......................................... | 502/304 |
| 5,254,519 | 10/1993 | Wan et al. ............................... | 502/252 |
| 5,260,249 | 11/1993 | Shiraishi et al. ........................ | 502/304 |
| 5,490,977 | 2/1996 | Wan et al. ............................... | 423/210 |
| 5,492,878 | 2/1996 | Fujii et al. .............................. | 502/304 |
| 5,494,878 | 2/1996 | Murakami et al. ..................... | 502/304 |
| 5,571,763 | 11/1996 | Takemoto et al. ...................... | 502/334 |
| 5,597,771 | 1/1997 | Hu et al. ................................. | 502/304 |
| 5,672,557 | 9/1997 | Williamson et al. ................... | 502/303 |
| 5,681,788 | 10/1997 | Kanesaka et al. ........................ | 502/65 |

FOREIGN PATENT DOCUMENTS 6-190282 7/1994 Japan.
7-108172 4/1995 Japan.

*Primary Examiner*—Nina Bhat

[57] ABSTRACT

An exhaust gas emission control catalyst includes an under catalyst layer containing at least one of barium and lanthanum and an over catalyst layer containing an agent for absorbing water in a gas, at least one of the under catalyst layer and over catalyst layer containing catalytic metal.

5 Claims, 3 Drawing Sheets

|  | NOx REMOVAL EFFICIENCY (%) 300°C ||
|  | BEFORE TREATMENT | AFTER TREATMENT |
|---|---|---|
| SAMPLE E-I | 85 % | 10 % |
| EXAMPLE I | 84 % | 32 % |
| EXAMPLE II | 80 % | 4 % |
| EXAMPLE III | 84 % | 20 % |

|  | PREPARED AMOUNT | ACTUAL AMOUNT | DESORPTION RATIO |
|---|---|---|---|
| SAMPLE E-I | 30 g/L | 28 g/L | 0.9 % |
| EXAMPLE I | 30 g/L | 24 g/L | 1.2 % |
| EXAMPLE II | 30 g/L | 27 g/L | 2.5 % |
| EXAMPLE III | 30 g/L | 29 g/L | 0.8 % |

DESORPTION RATIO
= {(WEIGHT BEFOEW TEST - WEIGHT AFTER TEST)
÷ WEIGHT BEFORE TEST} x 100

BURNED GAS PURIFYING CATALYST

This application is a continuation of application Ser. No. 08/639,507, filed Apr. 29, 1996, now U.S. Pat. No. 5,667,258.

BACKGROUND OF THE INVENTION

1. Field of the Invention

The invention relates to a gas purifying catalyst, and, more particularly, to a burned gas purifying catalyst for use with an exhaust system of an automobile engine suitable for emission level controls of nitrogen oxides (NOx), hydrocarbons (HC) and carbon monoxide (CO).

2. Description of the Related Art

As one of catalysts installed in an exhaust line of an automobile engine to purify the exhaust gas or to significantly lower emission levels of oxides of nitrogen (NOx) as well as hydrocarbons (HC) and carbon monoxide (CO) in the exhaust gas an automobile exhaust control catalyst, there has been a monolith type catalytic convertor which is formed with an under catalyst layer having active alumina particles and platinum (Pt) and rhodium (Rh) on a monolith honeycomb carrier and an over catalyst layer, coated over the under catalyst layer, which comprises barium-fixed ceria (cerium oxide) particles, active alumina particles and palladium (Pd). Such a catalyst is known from, for instance, Japanese Unexamined Patent Publication No. 3-207446. The reason for fixing barium (Ba) to the ceria particles is to prevent the ceria from suffering heat deterioration. The barium-fixed ceria particles are produced in such a manner to dry and solidify a mixture of a barium nitrate solution with ceria particles as a solid lump of barium nitrate-adsorbed ceria particles and break it into particles. The over catalyst layer is coated by dipping a catalyst carrier in a slurry of a palladium chloride solution with the barium nitrate-adsorbed ceria particles and, thereafter, dry and burn the slurry film on the catalyst carrier.

While barium (Ba) is essentially intended to play as an agent to prevent heat deterioration of ceria, it is in some cases used to purify exhaust gases, in particular to reduce nitrogen oxides (NOx) in exhaust gases as is known from, for instance, Japanese Unexamined Patent Publication No. 7-108172. The catalyst described in the Japanese Unexamined Patent Publication No. 7-108172 is a monolith honeycomb type catalytic convertor that carries an under catalyst layer having barium (Ba) supported by an alumina support and an over catalyst layer having platinum (Pt) and rhodium (Rh) supported by an alumina support. This catalyst reduces nitrogen oxides (NOx) through the steps of oxidizing nitrogen oxides (NOx) with the barium (Ba) in the over catalyst layer, a lowering the concentration of oxygen ($O_2$) in the exhaust gas so as to produce a reducing atmosphere in which the nitrogen oxides (NOx) are separated from the barium, and reducing the nitrogen oxides (NOx) by the catalytic metal in the under catalyst layer making the utilization of hydrocarbons (HC) and carbon monoxide (CO) in the exhaust gas as reducing agents.

A typical problem the exhaust gas emission control catalysts experience is sulfur (S) poisoning and/or water ($H_2O$) poisoning and is significant in particular if they contain large amounts of barium which has a strong tendency to be poisoned. It has been proved by the inventors of this invention that lanthanum (La) has a tendency of the sulfur (S) poisoning and/or water ($H_2O$) poisoning as well. Accordingly, unless the catalyst containing platinum and rhodium or palladium as main catalytic metals is kept away from the sulfur (S) poisoning and water ($H_2O$) poisoning, it is difficult that the catalyst maintains its intended emission control efficiency for a long period of time.

SUMMARY OF THE INVENTION

It is an object of the present invention to provide a catalyst construction for purifying gases which prevents lanthanum and barium from sulfur poisoning and/or water poisoning.

It is another object of the present invention to provide an catalyst construction for purifying automobile exhaust gases which maintains its intended emission control efficiency for a long period of time.

This invention has been achieved on the basis of the knowledge obtained from the results of various investigations and assessment conducted by the inventors of this application that a combination of a composition of barium and lanthanum and a zeolite support prevents the barium and lanthanum from sulfur poisoning and/or water poisoning and maintains the intended activity of the barium and lanthanum for a long period of time.

These objects of the present invention are achieved by providing a gas purifying catalyst construction comprising an under catalyst layer containing at least one of barium and lanthanum and an over catalyst layer containing an agent to absorbing water in a gas. The over catalyst layer prevents the barium and/or the lanthanum from sulfur poisoning and/or water poisoning. The catalytic metal may be contained either one or both of the under and over catalytic layers.

The water adsorbing agent comprises a crystalline metal silicate which works to prevent the barium and lanthanum from sulfur poisoning and/or water poisoning. This is because the metal silicate, such as MFI-type zeolite, is one of materials that exhibit excellent water adsorbing performance and prevent water poisoning, consequently. Further, the metal silicate in the over catalyst layer prevents the barium and lanthanum in the under catalyst layer from easily contacting with gases, enhancing the prevention of sulfur poisoning and/or water poisoning.

The over catalyst layer contains one or more selected from a noble metal group of catalytic materials such as platinum (Pt), rhodium (Rh), palladium (Pd) and iridium (Ir), which works to lower emission levels of oxides of nitrogen (NOx) as well as hydrocarbons (HC) and carbon monoxide (CO) in burned gases. In particular, when the over catalyst layer contains platinum and rhodium as the noble metal group of catalytic materials, the catalyst exhibits an excellent NOx emission control efficiency in burned gas resulting from the combustion of a lean air-fuel mixture through a synergistic effect of the platinum and rhodium catalytic materials and additives such as barium or lanthanum in combination.

If a small amount of palladium is added into the under catalyst layer, it is preferred to support the palladium by a cerium oxide or alumina so as to deposit the palladium particles separately from the rhodium particles. The reason for a decline in the catalytic activity with a rise in ambient temperature has been considered to be caused by the absence of intermediate products of the hydrocarbon combustion contributory to reduction or decomposition of nitrogen oxides which results from expeditious combustion of hydrocarbons. Although the reason for the improvement in high temperature NOx emission control efficiency of the catalyst resulting from the presence of the cerium oxide has not been clearly proved, the presence of cerium in the catalyst of the invention suppresses the combustion of hydrocarbons at high temperatures and produces easily intermediate products of the hydrocarbon combustion. When the cerium is contained in the under catalyst layer, the cerium is prevented by the barium and lanthanum from experiencing thermal deterioration and exhibits its primary chemical activity for a long period of time.

The under catalyst layer may contain an additive of palladium or alumina with the effect of improving low temperature catalytic activity of the catalyst. The palladium exhibits its catalytic activity at temperatures lower as compared with platinum and rhodium and burns hydrocarbons in low temperature exhaust gases from an automobile engine which is still cold. Consequently, even when the exhaust gas is still at low temperatures, the combustion of hydrocarbons by means of the under catalyst layer causes the over catalyst layer to rapidly raise its temperature sufficiently to burn hydrocarbons. The combustion of hydrocarbons is utilized to reduce or decompose nitrogen oxides in burned gases.

Contact of the palladium in the under catalyst layer with a large amount of hydrocarbons causes poisoning, lowering the catalytic performance. However, the metal silicate contained in the over catalyst layer absorbs hydrocarbons in burned gases and, consequently, prevent the palladium in the under catalyst layer from hydrocarbon poisoning even when insufficient combustion of hydrocarbons occurs while the engine is still cold.

Because, unlike platinum and rhodium, palladium is easy to exhibit its catalytic activity rather after having been oxidized, the catalyst containing palladium and alumina in the under catalyst layer exhibits well its catalytic activity since the alumina works more easily as a source of oxygen supply and promotes oxidization of the palladium. In this instance, the alumina is prevented by the barium and lanthanum from thermal deterioration.

The over catalyst layer preferably has a weight proportion relative to the total weight of the over and under catalyst layers in a range between 3/40 and 34/40. If the lower limit is exceeded, it will be difficult for the catalyst to form the over catalyst completely over the under catalyst layer and to exhibit an intended NOx emission control efficiency. On the other hand, if the upper limit is exceeded, the over catalyst layer arrests the catalytic effect of the barium and lanthanum or palladium in the over catalyst layer. In this instance, a significant feature is that, because the barium and lanthanum prevents thermal deterioration of the catalyst and works as a NOx absorbing agent to contribute the reduction of nitrogen oxides, the catalyst maintains a high NOx emission control efficiency even after the catalyst has been exposed to high temperature burned gases. Consequently, even when the over catalyst layer has the weight proportion less than 3/40, the catalyst exhibits the intended NOx emission control efficiency. If anything, the barium and lanthanum in the over catalyst layer which has rather a small weight proportion is more contributory to NOx emission control efficiency. In view of these facts, the over catalyst layer is more preferable to have the weight proportion in a range between 5/40 and 16/40.

The catalyst may be modified with the result of exhibiting the intended performance in that the over catalyst layer contains barium and the under catalyst layer contains a catalytic metal. In this case, the utilization is made of a crystalline metal silicate as a support for the barium which prevents the barium from sulfur poisoning and/or water poisoning. Containing the barium in the over catalyst layer makes it easy to manufacture the catalyst. In the case where the catalyst is made through steps of washcoating a slurry of barium on a carrier and further washcoating a slurry of the metal silicate mixed with a catalytic metal over the barium contained coating, if the slurry of the metal silicate mixed with a catalytic metal is acid, there occurs the problem that the barium in the under catalyst layer eluates in the form of a barium hydroxide $Ba(HO)_2$ into the slurry. Because the catalyst of the invention is, however, manufactured by a step of washcoating a slurry containing barium after having formed the under catalyst layer, the problem of the elusion of barium is not encountered.

The amount of barium in a range of 7 and 45% by weight of the total amount of the over and under catalyst layers is preferable for the catalyst to produce an improvement in NOx emission control efficiency. If the lower limit is exceeded, the barium is difficult to exhibit sufficiently its effect. On the other hand, if the upper limit is exceeded, the catalyst experiences a decline in NOx emission control efficiency this has been considered to be caused by an adverse effect of a large amount of the barium to the performance of other catalytic metals. In view of this point, an appropriate amount of barium is proved to be in a range between 10 and 30%.

The catalyst of the invention is manufactured in various manners. Specifically, when forming the under catalyst layer with barium contained, a slurry of alumina, ceria and binder, such as alumina binder, mixed with an appropriate amount of distilled water is washcoated on a monolith type honeycomb carrier. The coating is dried at a temperature between 150 and 300° C. for two to four hours and burned in the air at a temperature of approximately 500° C. for one to four hours. The barium in the form of a solid barium compound powder is contained in the slurry. As the solid barium compound, a barium oxide (BaO), a barium dioxide ($BaO_2$) a barium carbonate ($BaCO_3$) and a barium sulfate ($BaSO_4$) can be employed. In order to support the palladium in the under catalyst layer, the coating after having been burned is impregnated with a palladium nitrate solution and dried and burned.

Alternatively, an under coating is prepared by washcoating a slurry of alumina, ceria and alumina binder mixed with distilled water on the honeycomb carrier and drying and burning the slurry. Thereafter, the coating is impregnated with a palladium solution and with a barium solution in this order or vise versa. A solution of barium and palladium may be admitted. As the barium solution, it is preferred to employ a barium acetate solution and a barium nitrate solution. The under catalyst layer may be achieved by a number of times of impregnation a coating with palladium and barium and drying the coating and a final burning treatment of the coating.

When forming the over catalyst layer, a slurry of a powdered zeolite (crystalline metal silicate) with platinum and rhodium supported, a ceria powder and binder mixed with distilled water is prepared. The slurry is washcoated over the under catalyst layer, dried at a temperature between 150 and 300° C. for two to four hours and burned in the air at a temperature of approximately 500° C. for one to four hours. The powdered zeolite with platinum and rhodium supported is prepared by producing a slurry of a mixture comprising a zeolite powder, a palladium solution and a rhodium solution and spray drying and burning the slurry. Otherwise, the slurry may be solidified by evaporating solution liquids. Alternatively, the zeolite powder may be impregnated with a platinum solution and a rhodium solution, and dried and burned. A dinitrodiamine platinum solution and a rhodium nitrate solution may be employed as the platinum solution and rhodium solution, respectively.

Crystalline metal silicates are a porous material whose pore has a majority of microscopic pores and includes an aluminum group of metals as a main metal component of the crystal. Aluminosilicate silicate, i.e. zeolite, which is typical as an aluminum group metal, includes Y-type zeolite, moldenite, MFI-type zeolite, and β-type zeolite. In place of aluminum or together with aluminum, metal silicates containing gallium (Ga), cerium (Ce), manganese (Mn) or terbium (Tb) may be employed.

The ceria as a cerium oxide may be added in various forms. For example, if the ceria is added into the over catalyst layer, the ceria may be mixed with the metal silicate as a support for the platinum and rhodium. Alternatively, the ceria with the platinum and rhodium supported thereby may be mixed with the metal silicate with the platinum and rhodium supported thereby. The same forms can be taken to form the under catalyst layer.

While the ceria is available as a cerium oxide, it is easy to experience thermal deterioration. In view of thermal resistance, a double oxide of cerium and zirconium (Zr) is preferable to be employed as a cerium oxide. Alumina may be added together with the cerium oxide.

When forming the over catalyst layer with barium contained, the under catalyst layer is formed in advance by washcoating a slurry of alumina, ceria and binder mixed with an appropriate amount of distilled water on a monolith type honeycomb carrier. The coating is dried at a temperature between 150 and 300° C. for two to four hours and burned in the air at a temperature of approximately 500° C. for one to four hours. The palladium is contained in the under catalyst layer by impregnating the coating with a palladium nitrate solution and drying and burning the coating.

Thereafter, the over catalyst layer is formed by washcoating a slurry of powdered zeolite with platinum and rhodium supported thereby, ceria and binder mixed with an appropriate amount of distilled water, drying the coating at a temperature between 150 and 300° C. for two to four hours and burning it in the air at a temperature of approximately 500° C. for one to four hours.

The impregnation with barium can be carried out in various forms. For instance, a slurry comprised of a mixture of the zeolite powder (not containing a catalytic metal) and solid barium particles, a palladium solution and a rhodium solution is spray dried and burned.

A solution of platinum, a solution )f rhodium and a solution of barium may be added to the zeolite powder (not containing a catalytic metal). Otherwise, solid barium powder may be added into the slurry to be coated for the over catalyst layer. Alternatively, after impregnating with a barium solution a mixture of the powdered zeolite with platinum and rhodium supported thereby, powdered ceria and binder, a slurry may be prepared by adding distilled water to the mixture.

In order to add barium in both under and over catalyst layers, a slurry is prepared by mixing alumina, ceria and binder with distilled water and washcoated on a monolith type honeycomb carrier. The coating is dried at a temperature between 150 and 300° C. for two to four hours and burned in the air at a temperature of approximately 500° C. for one to four hours. Thereafter, the coating is impregnated with a palladium nitrate, dried at a temperature between 150 and 300° C. for two to four hours and burned in the air at a temperature of approximately 500° C. for one to four hours. Subsequently, a slurry is prepared by mixing powdered zeolite with platinum and rhodium supported thereby, ceria and binder with an appropriate amount of distilled water and washcoated over the under catalyst layer. The coating is dried at a temperature between 150 and 300° C. for two to four hours and burned in the air at a temperature of approximately 500° C. for one to four hours. Finally, the coatings are impregnated with a barium solution, achieving the under and over catalyst layers.

With regard to the under catalyst layer, the weight proportions of the alumina, ceria and binder relative to the honeycomb carrier are preferred to be 2–20%: less than 20%:1–10%, and more suitably to be 4–10%:1–10%: 2–5%.

On the other hand, with regard to the over catalyst layer, the weight proportions of the zeolite, ceria and binder relative to the honeycomb carrier are preferred to be 6–35%: less than 35%:2–20%, and more suitably to be 5–25%: 1–6%:5–10%.

The barium solution contains suitably barium between 0.5% by weight and a saturated concentration and more suitably higher than 1% by weight. The impregnation with the barium solution is suitably performed at a temperature between 10 and 40° C.

As the alumina, γ-alumina containing an appropriate amount, for instance 7.5% by weight, of lanthanum is suitably employed.

The amount of palladium is preferred to be between 0.5 and 20 grams, and more suitably between 1 and 7 grams, per one liter of the volume of the honeycomb carrier.

The weight proportion between the platinum and rhodium is preferably 75:1, and the total amount of the platinum and rhodium is preferably in a range between 0.5 and 6 grams, and more suitably between 1 and 4 grams, per one liter of the volume of the honeycomb carrier.

The catalyst containing at least one of barium and lanthanum in the under catalyst layer, a water absorbing agent in the over catalyst layer, and a catalyst metal in at least one of the under and over catalyst layers exhibits significantly excellent performance of reducing nitrogen oxides (NOx), hydrocarbons (HC) and carbon monoxide (CO) in an automotive engine exhaust gas to nitrogen ($N_2$), hydrogen dioxide ($HO_2$) and carbon dioxide ($CO_2$), respectively.

BRIEF DESCRIPTION OF THE DRAWINGS

The above and other objects and features of the present invention will be clearly understood from the following description with respect to a preferred embodiment thereof when considered in conjunction with the accompanying drawings, in which.

DETAILED DESCRIPTION OF THE PREFERRED EMBODIMENTS

Figures 1, 2, 3:
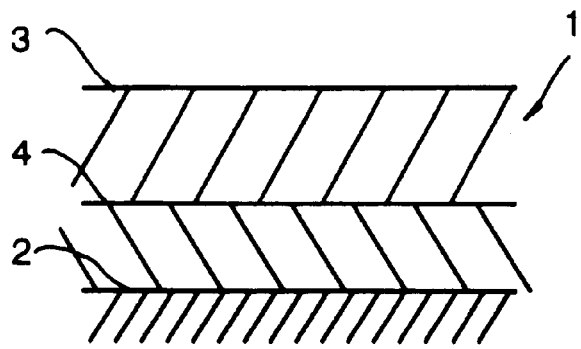
FIG. 1 is a schematic cross-sectional view showing a structure of a catalyst in accordance with an embodiment of the invention.
FIG. 2 is a table describing the result of NOx removal efficiency measurements for catalysts of Examples I–III and an evaluation sample catalyst E-I.
FIG. 3 is a table showing the result of evaluation of the effect of catalyst manufacturing steps on barium desorption.

As shown in FIG. 1, a catalyst 1 of the invention was comprised under and over catalyst layers 4 and 3 coated on a cordierite monolith honeycomb carrier 2 having 400 cells per square inch.

EXAMPLE I

The under catalyst layer 4 was formed by wash-coating a slurry of a composition of 60 grams of γ-alumina (a particle size of less than 4 μm, a purity of higher than 95%), 60 grams of ceria and 12 grams of alumina as a binder mixed with an appropriate amount of distilled water on the cordierite monolith honeycomb carrier 2, drying the coating at for 150° C. for two hours and burning the coating at 500° C. for two hours. Further, after having impregnated this coating with a dinitro-diamine palladium solution and dried at for 150° C. for two hours and further burned at 500° C. for two hours, the coating was impregnated with a barium nitrate solution. The over catalyst layer 3 was formed by wash-coating a slurry of 48 grams of a powdered catalyst composition, 63 grams of ceria (a particle size of less than 4 μm, a purity of higher than 95%) and 35 grams of alumina as a binder mixed with an appropriate amount of distilled water over the over catalyst layer 4 of the cordierite monolith honeycomb carrier 2, and drying the coating at 150° C. for two hours and burning it at 500° C. for two hours. The catalyst composition was prepared by spaydrying a mixture of 42 grams of an acid solution of dinitro-diamine platinum (II) nitrate, 1.0 gram of a rhodium nitrate solution and 144 grams of H-type zeolite ZSM5 ($SiO_2/Al_2O_3$=80) as a catalyst powder, drying the catalyst powder at 200° C. for two hours and burning it at 500° C. for two hours.

In the monolith honeycomb type catalyst construction thus prepared, the under catalyst layer 4 was comprised of a coating of 14% by weight of the cordierite monolith honeycomb carrier 2 and contained the alumina and ceria of a weight proportion of 1:1. The palladium contained in the layer was 4 grams relative to one liter of the volume of the monolith honeycomb carrier 2, and the barium contained in the layer was 47% by weight of the coating. The over catalysts layer 3 was comprised of a coating of 28% by weight of the cordierite monolith honeycomb carrier 2 and contained the zeolite ZSM5 and ceria of a weight weight proportion of 100:44. The platinum and rhodium contained in the layer were 1.8 grams and 0.024 grams, respectively, relative to one litter of the volume of the monolith honeycomb carrier 2, respectively. Impurities contained in the catalyst layers 3 and 4 were less than 1%.

EXAMPLE II

In this Example the over catalyst layer 3 described in Example I was modified in that barium was impregnated not in the under catalyst layer but in the over catalyst layer. The over catalyst layer was formed by washcoating a slurry of a compound comprising a powdered zeolite ZSN5 support and platinum and rhodium catalyst particles and a ceria and binder mixture mixed with an appropriate amount of distilled water. The barium contained in the over catalyst layer was 23% by weight of the coating.

EXAMPLE III

In this example, barium was deposited in the whole catalyst layer by impregnating both over and under catalyst layers 3 and 4 with a barium nitrate solution and drying and burning the coatings on the same conditions as described in Example I. The barium contained in the whole catalyst layers was 15% by weight of the coatings.

In order to make comparative evaluation of the emission control efficiency of the catalysts described in Examples I through II, an evaluation sample catalyst E-I was prepared.

The evaluation sample catalyst E-I was prepared by forming only an under catalyst layer of 42% by weight of the monolith honeycomb carrier 2. The single catalyst layer was impregnated with barium in the same manner and on the same conditions as described in Example I.

EVALUATION

In order to assess the resistance of Examples I–III and the comparative sample catalyst E-I against sulfur (S) poisoning, evaluation tests were conducted by the utilization of a fixed bed flow-through type reaction system. Evaluation was made from measurements of NOx removal efficiency of the catalyst which was set in the fixed bed flow-through type reaction system and exposed to a pre-heated gas at approximately 300° C. simulated as a burned gas of an air-fuel mixture of A/F=22 for a predetermined period of time. Measurements were made for the respective catalysts before and after sulfur-treatment in which the catalyst is exposed to a sulfur gas for sulfur poisoning.

The simulated burned gas had compositions as follows:

| | |
|---|---|
| HC | 4,000 ppm |
| NO | 250 ppm |
| CO | 0.15% |
| $CO_2$ | 7.7% |
| $H_2$ | 150 ppm |
| $O_2$ | 7% |
| $N_2$ | the rest |

The result of measurements is shown in FIG. 2.

As apparent from FIG. 2, the result proves that there is no significant difference in nitrogen oxide removal efficiency among the catalysts before the sulfur-treatment and, however, pronounced differences in nitrogen oxide removal efficiency among the catalysts after the sulfur-treatment. Specifically, the catalyst of Example I has the best nitrogen oxide removal efficiency do not show in nitrogen oxide removal efficiency. This is because the barium is concentrated in the under catalyst layer and effectively protected by the zeolite ZSM5 in the over catalyst layer from sulfur poisoning, consequently. Of all of them, the catalyst of Example II is the worst. It is considered that the barium which is contained in the over catalyst layer only significantly suffers sulfur poisoning due to direct exposure to the burned gas. Although the evaluation sample catalyst E-I contains no zeolite ZSM5, it demonstrates a favorable result. This is considered to result from the distribution of barium over the inside of the single catalyst layer which prevents the direct exposure of the barium to the burned gas which causes less sulfur poisoning of the barium. The catalyst of Example III, which contains barium in both under and over catalyst layers, demonstrates a nitrogen oxide removal efficiency better than the evaluation sample catalyst E-I. This is considered that the zeolite ZSM5 in the over catalyst layer protects the barium in the under catalyst layer and suppresses sulfur poisoning of the barium.

In order to evaluate the steps of manufacturing the catalyst of the invention, each catalyst was prepared by coating a catalyst material containing barium of 30 grams relative to one liter of the volume of the cordierite monolith honeycomb carrier 2. Measurements were made for the actual amount of barium in the catalyst and the ratio of barium desorption. In barium desorption tests, the weight of the catalyst was measured after exposing the fresh catalyst to ultrasonic waves for three hours and drying it at temperatures between 150° C. and 200° C. The amount of barium was investigated by the utilization of inductively coupled plasma (ICP) method. The result is shown in FIG. 3.

As clearly understood from FIG. 3, the catalysts of Example II and III and evaluation sample catalyst E-I have relatively high actual measurements of barium. The reason for the lowest actual measurement of the catalyst of Example I which contains barium in the under catalyst layer only is considered that the barium in the under catalyst layer is contacted by the weak acid slurry during coating the over catalyst layer with the effect of being released as a hydroxide. Accordingly, in view of preventing the barium from being released and changed in amount, it is preferred to contain the barium in the over catalyst layer.

With regard to the desorption resistance, of all of the tested catalysts, the catalyst of Example II, which contains the barium in the over catalyst layer only, has the highest desorption ratio. This is because the over catalyst layer is hardened with the presence of barium and yields a large difference in thermal expansion coefficient relative to the under catalyst layer, resulting easy separation from the under catalyst layer.

The effect of amounts of barium in the catalyst of Example 1 on NOx removal efficiency was investigated by the utilization of the same fixed bed flow-through type reaction system as described previously. A burned gas (of an air-fuel mixture of A/F=22) simulated as follows was used:

| HC | 4,000 ppm |
| NO | 160 ppm |
| CO | 0.16% |
| $CO_2$ | 9.74% |
| $H_2$ | 650 ppm |
| $O_2$ | 7% |
| $N_2$ | the rest |

Figure 4:
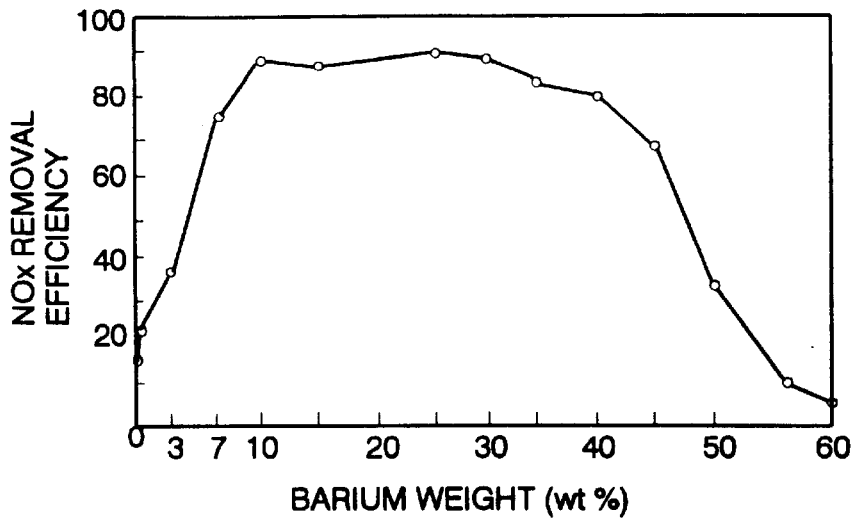
FIG. 4 is a graph showing the effect of the amount of barium on NOx removal efficiency.

The result of measurements is shown in FIG. 4. The amount of barium is shown by a weight percent relative to the total weight of the catalyst layers.

As clearly understood from FIG. 4, it is proved that the catalyst demonstrates the highest NOx removal efficiency for the amount of barium in a range from 7 to 45%, in particular from 10 to 30%. The reason for the low NOx removal efficiency of the catalysts which contain only small amounts of barium is that the barium adsorbs only a small amount of nitrogen oxides. On the other hand, the reason for a reduction in NOx removal efficiency of the catalysts which contain excessive amounts of barium is that the barium rather prevents platinum and rhodium from reducing nitrogen oxides.

The effect of total amounts of the under and over catalyst layers on NOx emission control efficiency was investigated. Together, the effect of the presence of platinum or barium in the under layer on NOx emission control efficiency was also investigated. Three types of test catalysts having a total amount of 40% by weight of the cordierite monolith honeycomb carrier 2 were prepared.

Test catalyst I: Both under and over catalyst layers contain no barium.

Test catalyst II: Only the under catalyst layer, which contains only palladium as a catalytic metal, contains barium.

Test catalyst III: Only the under catalyst layer, which contains both palladium and platinum as catalytic metals, contains barium.

All of these test catalysts I–III were made in the same manner as previously described for the catalyst of Example I, excepting the amounts of the under and over catalyst layers. Specifically, the test catalyst I is formed in the same manner as that for the catalyst of Example I excepting not impregnating the catalyst layers with barium. The test catalyst III is formed in the same manner as that for the catalyst of Example I excepting impregnating the under catalyst layer with platinum by the use of a dinitro-diamine platinum solution.

Each of the test catalysts II and III contained the barium of 15% by weight of the total amount of the under and over catalyst layers and the palladium of 4 grams relative to one liter of the volume of the cordierite monolith honeycomb carrier 2. The test catalyst I contained the palladium of 7 grams relative to one liter of the volume of the cordierite monolith honeycomb carrier 2. The test catalyst III contained the palladium of 2 grams relative to one litter of the volume of the cordierite monolith honeycomb carrier 2 in the under catalyst layer. Each test catalyst I, II, III contained the platinum and rhodium of 1.1 grams relative to one litter of the volume of the cordierite monolith honeycomb carrier 2 in the over catalyst layer, the weight proportion between the platinum and rhodium being 75:1.

Measurements of emission control efficiency were conducted for the test catalysts after heat-aging treatment at 900° C. for 50 hours by the utilization of the same fixed bed flow-through type reaction system as described previously. A burned gas (of an air-fuel mixture of A/F=22) used was simulated as follows:

| HC | 4,000 ppm |
| NO | 250 ppm |
| CO | 0.15% |
| $CO_2$ | 7.7% |
| $H_2$ | 160 ppm |
| $O_2$ | 7% |
| $N_2$ | the rest |

Figure 5:
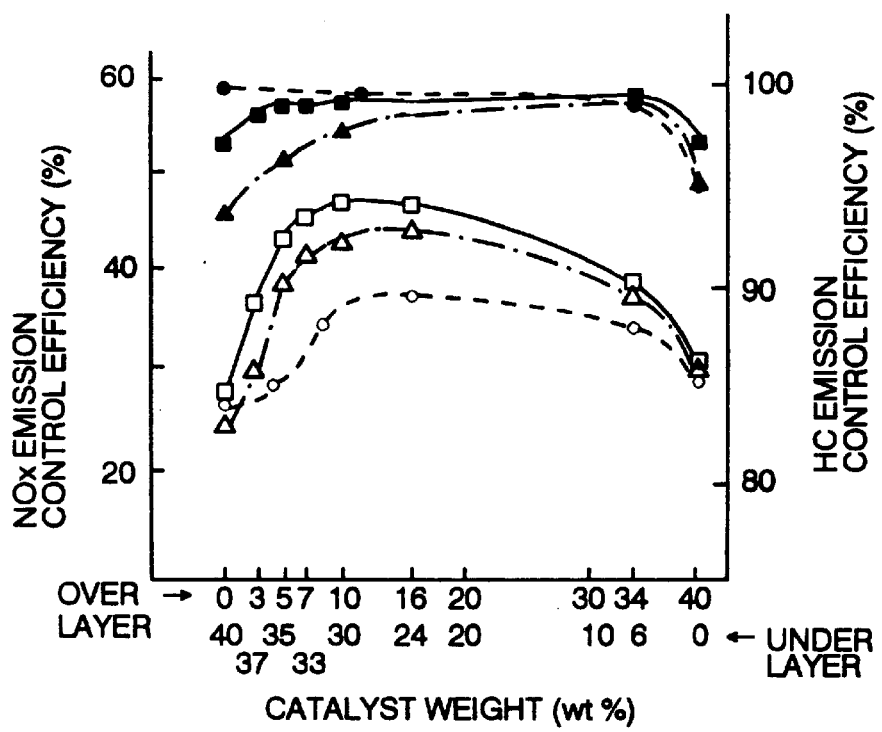
FIG. 5 is a graph showing the effect of the total amount of catalyst layers on NOx emission control efficiency.

The result of measurements is shown in FIG. 5. The NOx emission control efficiency was measured with regard to maximum values for the pre-heated simulated gas. Further, the HC emission control efficiency was measured with the use of the pre-heated simulated gas at 300° C.

The result demonstrates that the test catalysts II and III, which contain barium, show NOx emission control efficiency considerably higher over the range of amounts of catalyst layers than the test catalyst I without barium contained. This results from the contribution of the barium to the reduction of nitrogen oxides. With regard to the weight proportion between the under and over catalyst layers, as compared with the test catalyst I, each of the test catalysts II and III demonstrates high NOx emission control efficiency even when it comprises only a very small amount of coating for the over catalyst layer and has a tendency to have high NOx emission control efficiency when the weight proportion of the over catalyst layer relative to the under catalyst layer is small rather than large. That is, an increase in the amount of coating for the over catalyst layer makes the under catalyst layer difficult to exhibit the effect of a barium additive. Considering the effect of the presence of platinum in the under catalyst layer on NOx emission control efficiency, the test catalyst III containing platinum shows NOx emission control efficiency higher over the range than the test catalyst II containing no platinum.

While the result demonstrates that the presence of barium does not produce a significant effect on HC emission control efficiency, nevertheless, there is a tendency to decline the HC emission control efficiency with a decline in weight proportion of the under catalyst layer. This is because the heat-aging treatment causes sintering of the noble metals and deterioration of the barium in the under catalyst layer. A coating over 5% by weight for the over catalyst layer diminishes this tendency. The effect of the presence of platinum in the under catalyst layer on the HC emission control efficiency is the same as on the NOx emission control efficiency, and the test catalyst III containing platinum exhibits a favorable HC emission control efficiency more than the test catalysts I and II.

From the above discussion, it is proved that, if the catalyst contains barium in the under catalyst layer, the weight proportion of the under catalyst layer relative to the total catalyst layer is preferred to be in a range between 3/40 and 34/40, more desirably between 5/40 and 16/40.

EXAMPLE IV

In order to evaluate the NOx emission control efficiency of a fresh catalyst of the type containing barium in the under catalyst layer, a catalyst of Example IV and an evaluation sample catalyst E-II were prepared. This catalyst of Example IV was comprised of an under catalyst layer containing the platinum and palladium whose amounts were 2 grams and 7 grams, respectively, relative to one liter of the volume of the cordierite monolith honeycomb carrier 2 and barium whose amount was 15% by weight of the total amount of the coatings. For the evaluation sample catalyst E-II, the evaluation sample catalyst E-II was modified in that the single catalyst layer is added with platinum. The single catalyst layer contained the platinum and palladium whose amounts were 2 grams and 7 grams, respectively, relative to one liter of the volume of the cordierite monolith honeycomb carrier 2 and the barium whose amount was 15% by weight of the amount of the coating.

The measurement of NOx emission control efficiency demonstrated 52% for the fresh catalyst of Example IV and 35% for the fresh evaluation sample catalyst E-I. This result proves that the under catalyst layer is advantageous to contain platinum as well as palladium and barium.

In order to investigate the effect of lanthanum (La) on NOx emission control efficiency, catalysts of Examples V–VII were prepared.

EXAMPLE V

The catalyst of Example V was comprises of an under catalyst layer 4 formed by wash-coating a slurry of a composition of γ-alumina powder and an alumina binder mixed with an appropriate amount of water on a cordierite monolith honeycomb carrier 2, and burning the coating at 500° C. for two hours. After having impregnated the coating with a specified concentration of palladium nitrate solution and dried and burned at 500° C. for two hours, the coating was further impregnated with a lanthanum salt solution and dried and burned at 500° C. for two hours. As the lanthanum salt, a lanthanum nitrate was employed. The impregnation of palladium and lanthanum may be carried out simultaneously.

The over catalyst layer 3 was formed by washcoating a slurry of a powdered catalyst composition and alumina binder mixed with an appropriate amount of water over the under catalyst layer and drying and burning the coating at 500° C. for two hours. The catalyst composition was prepared by spaydrying a mixture of a platinum nitrate-phosphorous solution (a solution of dinitro-diamine platinum (II) nitrate) and a rhodium nitrate solution mixed with H-and MFI-type powdered zeolite and providing a platinum and rhodium contained zeolite catalyst powder.

In the monolith honeycomb type catalyst construction thus prepared, the under catalyst layer 4 was comprised of a coating of 15% by weight of the cordierite monolith honeycomb carrier 2 and contained the alumina, excepting alumina binder, of 13.5% by weight of the cordierite monolith honeycomb carrier 2. The over catalyst layer 3 was comprised of a coating of 30% by weight of the cordierite monolith honeycomb carrier 2 and contained the zeolite of 24% by weight of the cordierite monolith honeycomb carrier 2. The amount of the palladium in the under catalyst layer 4 was 6.8 grams per one liter of the volume of the cordierite monolith honeycomb carrier 2. The amount of the lanthanum was 8% by weight of the aluminum in the base catalyst layer 4, i.e. 8 parts of the lanthanum relative to 100 parts of the aluminum. The platinum and rhodium in the over catalyst layer was 3 grams by total weight per one liter and had a proportion of 75:1.

EXAMPLE VI

In the Example the catalyst of Example V was modified in that the over catalyst layer contained lanthanum and barium as well as palladium and the amounts of these lanthanum and barium were 4% by weight of the aluminum in the base catalyst layer 4. The proporlayers 3 and 4 was the sar catalyst layers 3 and 4 was the same as that of Example V. A barium nitrate solution was used to impregnate the under catalyst layer with the barium.

EXAMPLE VII

In this Example the over catalyst layer 3 of Example I was modified in that the amount of ceria was 30% by weight of the coating. The under catalyst layer 4 contained palladium, lanthanum and barium supported by an alumina and ceria composition. The amount of ceria was 30% by weight of the coating. The amount of the palladium was 6.9 grams per one liter, and the amounts of the lanthanum and barium were 4% by weight of the aluminum in the base catalyst layer 4. The proportion of the over and under catalyst layers 3 and 4 was the same as that of Example V. The under catalyst layer 4 was formed by impregnating a coating of a powered composition of alumina and ceria with a palladium salt, a lanthanum salt and a barium salt in this order and burning the coating.

In order to assess the temperature dependency of NOx emission control efficiency of Examples V–VII, evaluation tests were conducted by the utilization of the fixed bed flow-through type reaction system. Evaluation was made from measurements of NOx emission control efficiency of the respective catalyst before and after heat-aging treatment in the air 900° C. for 50 hours. The result is shown in FIG. 6.

Figure 6:
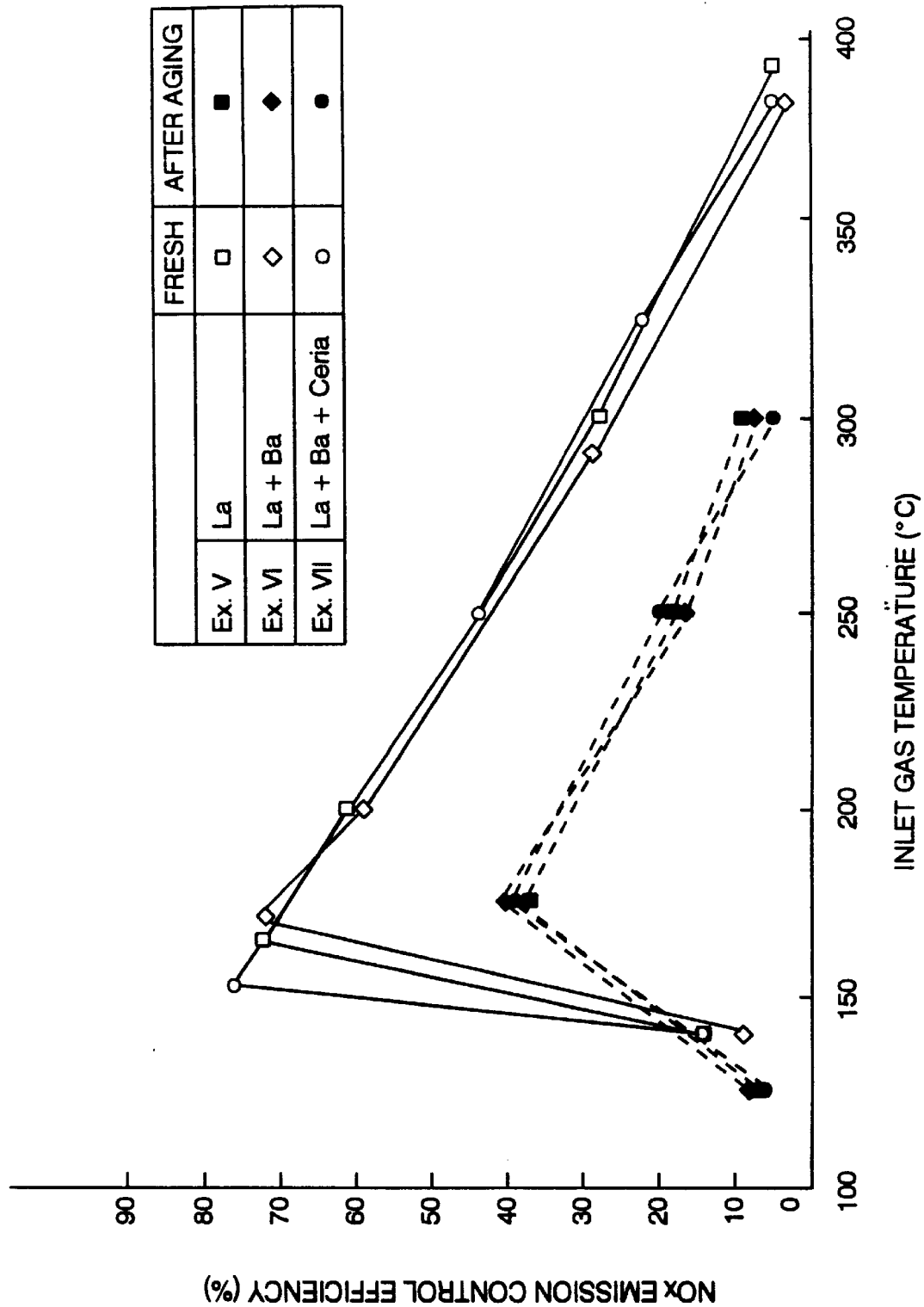
FIG. 6 is a graph showing the temperature dependency of NOx emission control efficiency.

It is clearly understood from FIG. 6 that each of the catalysts of Example V–VII, which contain either one or both of the lanthanum and barium, demonstrates a decline in NOx emission control efficiency at both low and high temperatures. This fact proves that the presence of at least one of the lanthanum and barium produces an improvement in heat-resistance and that the lanthanum works just like the barium.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A catalyst construction for purifying a gas comprising:

a catalyst carrier;

an under catalyst layer coated on said catalyst carrier for absorbing oxides of nitrogen (NOx) in a gas, said under catalyst layer containing platinum and at least one of barium and lanthanum; and an over catalyst layer coated on said under catalyst layer for lowering emission level of oxides of nitrogen (NOx) and hydrocarbons (HC), said over catalyst layer containing crystalline metal silicate carrying at least one of barium and rhodium.

2. A catalyst construction as defined in claim 1, wherein said under catalyst layer further contains palladium.

3. A catalyst construction as recited in claim 1, wherein a weight content of said barium is 7 to 45% of a total weight of said under and over catalyst layers.

4. A catalyst construction as recited in claim 1, wherein said over catalyst layer has a weight proportion relative to a total weight of said over catalyst layer and said under catalyst layer in a range between 3/40 and 34/40.

5. A catalyst construction as recited in claim 1, wherein said over catalyst layer further contains cerium oxide.

* * * * *